E. BYLUND.
HOSE COUPLING.
APPLICATION FILED APR. 1, 1914.
1,196,928.
Patented Sept. 5, 1916.
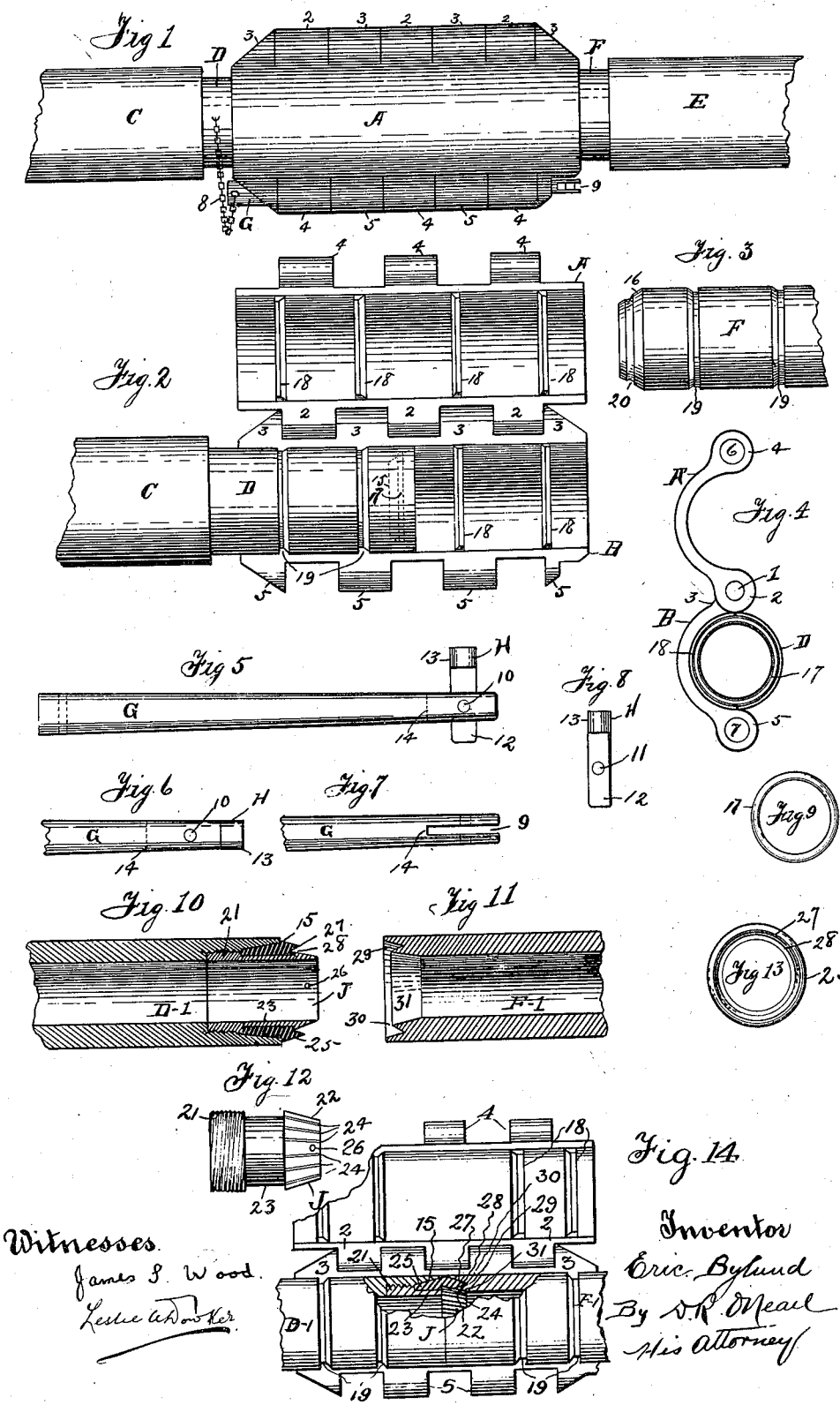
Witnesses.
James P. Wood.
Leslie A. Dooker.
Inventor
Eric Bylund
By D. P. O'Neal
His Attorney

UNITED STATES PATENT OFFICE.

ERIC BYLUND, OF WINNIPEG, MANITOBA, CANADA.

HOSE-COUPLING.

1,196,928. Specification of Letters Patent. Patented Sept. 5, 1916.

Application filed April 1, 1914. Serial No. 828,888.

*To all whom it may concern:*

Be it known that I, ERIC BYLUND, a citizen of the Dominion of Canada, residing at the city of Winnipeg, in the Province of Manitoba, Canada, have invented certain new and useful Improvements in Hose-Couplings, of which the following is a specification.

My invention relates to improvements in couplings used on fire and garden hose, and similar flexible fluid carriers, and the objects of the invention are to provide a coupling free from the objections which attach to the screw form of couplings now in every day use.

I attain my object by the means set out in the following specifications and claims, and fully illustrated in the accompanying drawings in which similar characters of reference refer to similar parts throughout.

Referring to these, Figure 1 is an elevation of my coupling as it would appear when connecting two lengths of hose and ready for use. Fig. 2 shows the coupling open and ready to receive the end of a length of hose. Fig. 3 is a hose connection ready to be placed in the coupling. Fig. 4 is an end view of the coupling in its opened position. Fig. 5 is a view of the locking pin which maintains the coupling in closed position, with the securing device in operative position. Fig. 6 is a fragment of the locking pin, with the securing device in in-operative position. Fig. 7 is a fragment of the locking pin, showing the forked end in which the securing device is located. Fig. 8 shows the securing device separate from the locking pin. Fig. 9 represents one style of packing which may be used to secure a water tight joint between the pipes. Fig. 10 shows a male hose connection fitted with a different style of packing. Fig. 11 is a view of the opposite or female hose connection. Fig. 12 is the packing retainer and Fig. 13 is an end view of the second style of packing. Fig. 14 illustrates on a reduced scale, a complete coupling embodying the features shown in Figs. 10, 11, 12 and 13, a portion of the coupling members being broken away to show the details of the connection.

In the drawings the upper or opening half of the coupling is indicated by the letter A and the opposite half by the letter B.

C is a piece of flexible hose terminating in a metal end D, which forms a permanent part of the coupling. E is a similar piece of flexible hose terminating in the metal end F, which is adapted to be embraced between the parts A and B of the coupling, in the manner hereinafter described, thus effecting a junction between the lengths of hose represented as C and E.

As shown the coupling proper consists of the parts A and B permanently hinge connected with each other in butt fashion by a pin 1 which passes through an intercommunicating alined passage through the alternately interconnecting parts 2 and 3 pertaining respectively to the members A and B. Similarly the outer edges of the members A and B are furnished with projections 4 and 5, those on the one part being adapted to interconnect alternately with those on the other, the projections 4 having a longitudinally alined opening 6 passing through them from end to end, adapted to register with a similarly disposed passage 7 through the projections 5, when the parts are brought together.

It will be noted that the openings 6 and 7 form a continuous passage through the parts 4 and 5 when the coupling is closed, and that the said passage tapers slightly from end to end.

A tapering pin G preferably secured to the part D by a chain 8 as a means of security, is adapted to be passed through the openings 6 and 7 in the parts 4 and 5 thus locking the parts A and B in their closed position. The smaller end of the pin G is forked as shown at 9 in Fig. 7, a member H, also shown as Fig. 8, being pivotally secured in the fork 9 by a stud 10 which passes through both prongs of the fork 9 and the opening 11 in the member H.

The part 12 of the member H is flattened on both sides so that it may operatively fit in the fork 9, to the shape of which it conforms both in cross and longitudinal dimension. The end 13 of the member H is circular in shape and of the same diameter approximately, as the end of the pin G.

When it is desired to lock the parts A and B of the coupling together, the member H is placed in the position shown in Fig. 6, that is to say, with its head 13 preceding the point of the pin G and its flattened portion 12 disposed entirely within the fork 9. In this position it offers no resistance to the passage of the pin G through the openings 6 and 7 in the parts 4 and 5. When the pin G is in place the member H is turned upon the stud 10 to the position shown in Fig. 5, that is to say crosswise, the head 13 upon one side and the point of the portion 12 upon the opposite side, in which position the pin G is effectually secured from accidental dislodgment.

As previously mentioned the part 12 of the member H fills the fork 9 lengthwise, so that when placed longitudinally the point of the portion 12 is in contact with the end 14 of the fork 9, in which position, should there be any difficulty met with in removing the pin G the head 13 of the member H may be struck with a hammer or any other suitable tool without damage to the stud 10, and the pin G driven from its seat.

It is preferable that the metal end D of the hose C should form a permanent part of the coupling and remain secured to the part B thereof, as shown in Fig. 2, thus forming a female end, while the opposite end of the same would be a male end similar to F in Fig. 3, adapted to be received by a coupling similar to that under description. The interior of the end of the pipe D is beveled out as shown by the dotted lines 15 in Fig. 2 for the reception of the end 16 of the pipe F which is tapered to fit therein.

17 indicates a ring packing preferably of rubber which follows the inner circumference of the pipe D, the tapered part 16 of the pipe F being provided with a groove 20 to receive the packing when the pipes are brought together. The beveled part of the pipe D, is grooved to retain the packing in position when the coupling is opened, and the hose connection broken.

The numerals 18 indicate inwardly extending ribs adapted to enter the grooves 19 around the circumference of the pipes D and F. It will be noted that the ribs 18 are beveled upon that side of them nearest the center of the coupling, and that the grooves in the pipes are cut with a beveled side to match.

It will be noted that the packing 17 is of a thickness which allows it to encroach inwardy past the surface of the pipe D for the purpose about to be explained.

As previously stated the pipe D preferably forms a part of the coupling: in order to connect with the hose E it is only necessary to place the pipe F in the part B with its tapered portion 16 within the end of the pipe D and close the part A down upon it. The ribs 18 will enter the grooves 19 on both pipes, and as the pipe D is stationary, the bevel on the face of the ribs 18 will operate upon the beveled faces of the grooves 19 to draw the pipe F forward.

The packing 17 will enter the groove 20 on the part 16 of the pipe F and be compressed, thus insuring a water tight joint between the pipes D and F. As the locking pin G is tapered it assists as it passes through the openings 4 and 5 to bring about this result. When the pin G is in place the member H is turned to the position shown in Figs. 1 and 5, when the pin G is effectually prevented from being removed till the member H is again brought into longitudinal alinement with it.

It is of course obvious that the ring packing 17, could be secured in the groove 20 on the beveled part 16 of the pipe F, instead of in the interior of the pipe D with the same result.

Figs. 10, 11, 12 and 13 illustrate a somewhat different form of packing and the means used to retain it in position. By reference to Fig. 10 it will be seen, that the mouth of the pipe $D^1$ is beveled back interiorly at 15 as in the previous description, and is further interiorly screw-threaded at the rear of the bevel to receive the screw-threaded portion 21 of the packing retainer J, (Fig. 12). The retainer J consists of three parts, the screw-threaded portion 21, the forwardly beveled portion 22 and the connecting portion 23 the diameter of which is less than that of the parts 21 and 22 with which it connects. The face of the beveled portion 22 is provided with longitudinally extending grooves 24 for a purpose to be explained. A circular rubber packing 25 is disposed on the member J, encircling and occupying the full length of the portion 23 thereof, the parts 21 and 22 forming shoulders at either end to retain it in position.

The packing 25 is, it will be understood, of peculiar shape, that portion of it abutting on the screw-threaded portion 21 of the retainer being tapered back to entirely fill the space between the part 23 of the retainer and the beveled part 15 of the pipe $D^1$ when the retainer J is screwed into the pipe D, which is done by the use of a spanner in the holes 26 in the end of the part J.

The front of the packing 25 is beveled forward and back to form with the part 22 of the part J the alternate concentric projection 27 and depression 28, and the end of the pipe $F^1$ (Fig. 11) is formed with a deep concentric groove 29 shaped to receive the projection 27, a projection 30 to fit the depression 28 and an interior bevel 31 to match the bevel of the part 22 of the member J when the ends of the pipes $D^1$ and $F^1$ are brought together. When the pipes have been brought together and are secured in the coupling as previously described, and fluid has entered the pipes under pressure a portion of it passes up the face of the part 22 by means of the grooves 24 and exerts a pressure on the inner face of the projecting portion 27 of the packing thus forcing it out against face of the groove 29 in the end of the pipe F and forming a water tight joint between the two.

From the foregoing description it will be seen that my invention is a wide departure from the forms of coupling previously used. The older forms for the most part depend upon the accuracy of screw threads for their effectiveness. These are entirely absent from my coupling, and all the attendant difficulties met with in freezing weather are avoided.

My coupling is quick and accurate and no special tools are required to operate it. The only part of the coupling liable to deterioration in any way is the ring packing, and as this may be of the styles described or any other deemed desirable, and as it may be removed and replaced without difficulty, it becomes rather an advantage than a drawback.

Having thus fully described my said invention what I claim as new and desire to secure by Letters Patent, is,—

1. In a hose coupling in combination, a coupling member, a packing retainer detachably secured within the coupling member and having a peripheral groove and an end of conical male formation projecting beyond the coupling member, the end of the coupling member shaped to afford an annular socket around the retainer to co-act with the groove therein to retain a packing; an annular packing mounted on the retainer and shaped to present a forwardly projecting conical ridge concentric with the end of the retainer and spaced therefrom; a second coupling member of female conical formation having an end groove concentric with the open end of the member; two semi-cylindrical hinge-connected members adapted to embrace the coupling members and provided on their internal surfaces with a series of ridges having inclined faces to coöperate with a series of grooves having corresponding inclined faces provided on the external surfaces of each of the coupling members to give to said coupling members an axial displacement when the hinge-connected members are closed around them, whereby the male and female ends of the packing retainer and second coupling member respectively are forced into engagement and the ridge on the packing compressed in the end groove in the second coupling member.

2. In a hose coupling in combination, a coupling member, a packing retainer detachably secured within the coupling member and having a peripheral groove and an end of conical male formation projecting beyond the coupling member, the end of the coupling member shaped to afford an annular socket around the retainer to coact with the groove therein to retain a packing; a ring packing mounted on the retainer and shaped to present a forwardly projecting ridge concentric with the end of the retainer and spaced therefrom; a second coupling member of female conical formation having an end groove concentric with the open end of the member; two semi-cylindrical hinge-connected members adapted to embrace the coupling members and provided on their internal surfaces with a series of ridges having inclined faces to coöperate with a series of grooves having corresponding inclined faces provided on the external surfaces of each of the coupling members to give to said coupling members an axial displacement when the hinge-connected members are closed around them, the male and female ends of the packing retainer and second coupling member being thereby forced into engagement and the packing compressed in the end groove in the second coupling member, and longitudinal grooves in the conical portion of the retainer to permit pressure from within the hose to act upon the packing.

3. In a hose coupling in combination, a coupling member provided with a packing retainer having a peripheral groove and an end of conical male formation projecting beyond the coupling member, the end of the coupling member being shaped to afford a socket around the retainer to co-act therewith to retain a packing; a ring packing mounted on the retainer having a ridge concentric with the end thereof; a second coupling member of female conical formation and having its end shaped to receive the ridge on the packing; two semi-cylindrical hinge-connected members adapted to embrace the coupling members and provided on their internal surfaces with ridges having inclined faces to coöperate with grooves having corresponding inclined faces provided on the external surfaces of the coupling members to give to said coupling members an axial displacement when the hinge-connected members are closed around them, and means on the hinge-connected members whereby they may be locked around the coupling members.

4. In a hose coupling in combination, a coupling member, a packing retainer secured to the coupling member and having a peripheral groove and an end of conical male formation projecting beyond the coupling member, the end of the coupling member providing a socket around the retainer to receive a packing; a packing mounted in the said socket and having a forwardly projecting ridge; a second coupling member of female conical formation to receive the end of the packing retainer and shaped to fit the packing, and means formed between the retainer and second coupling member to permit pressure from within the coupling to act upon the packing.

In testimony whereof, I affix my signature in the presence of two witnesses.

ERIC BYLUND.

Witnesses:
  JAMES S. WOOD,
  LESLIE A. DOWKER.